April 13, 1943.   I. E. COFFEY   2,316,316
FLUID PRESSURE MOTOR
Filed April 17, 1941   4 Sheets-Sheet 1

INVENTOR
IRVEN E. COFFEY
ATTORNEY

INVENTOR
IRVEN E. COFFEY
ATTORNEY

April 13, 1943.     I. E. COFFEY     2,316,316
FLUID PRESSURE MOTOR
Filed April 17, 1941     4 Sheets-Sheet 3
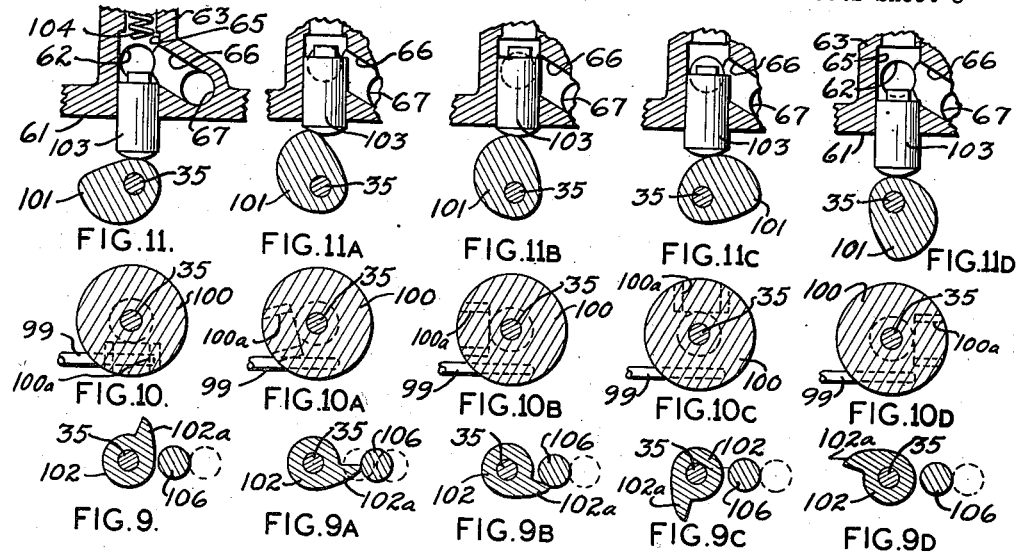
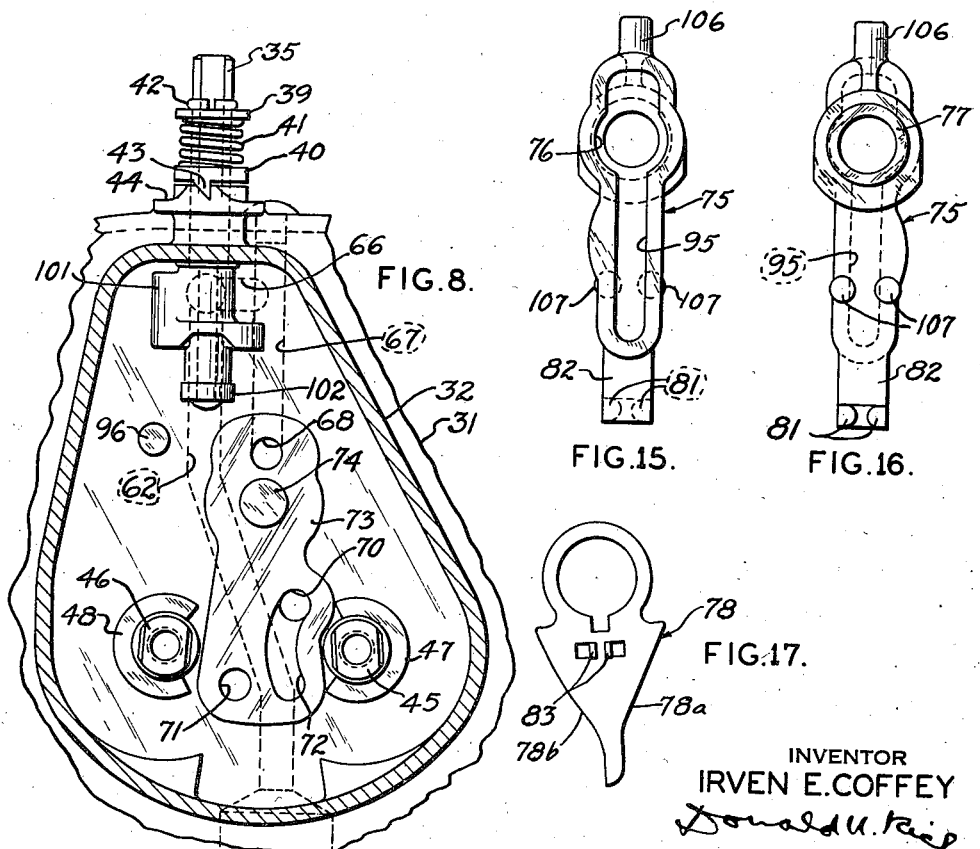
INVENTOR
IRVEN E. COFFEY
ATTORNEY

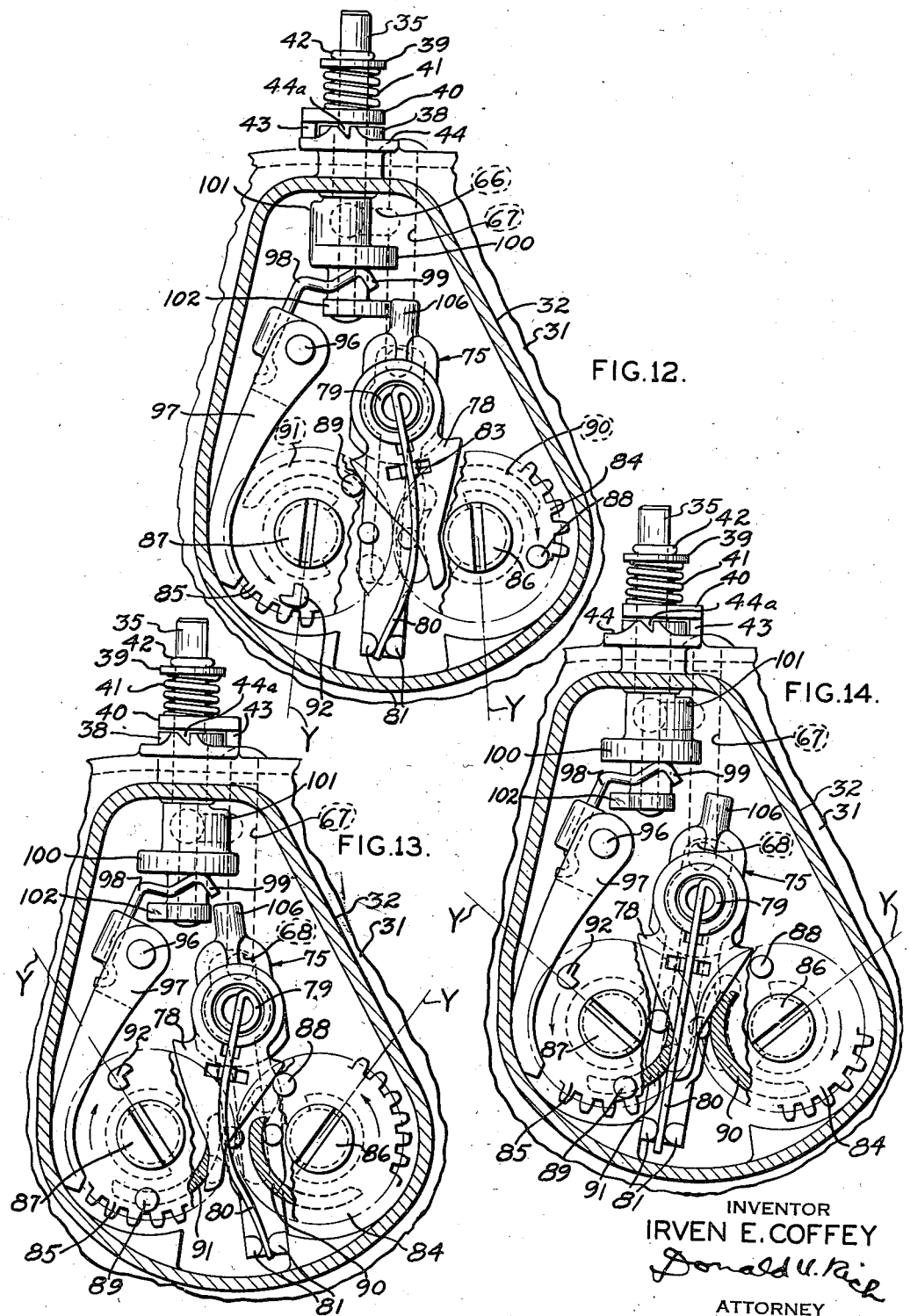

Patented Apr. 13, 1943

2,316,316

UNITED STATES PATENT OFFICE 2,316,316

FLUID PRESSURE MOTOR

Irven E. Coffey, Normandy, Mo., assignor to Carter Carburetor Corporation, St. Louis, Mo., a corporation of Delaware Application April 17, 1941, Serial No. 388,975

15 Claims. (Cl. 121—98)

This invention relates to power drives, particularly of the differential fluid pressure type, and controls therefor, as frequently used for operating vehicle windshield wipers.

Fluid pressure windshield wiper motors as now commonly in use include a multiplicity of small, delicate parts which require frequent repair. These motors embody an over-center or toggle type of pressure reversing valve in which the actuating spring is most highly stressed at an intermediate point in the stroke of the valve shifter element which passes over-center so as to apply the spring tension to shifting of the valve. This spring remains highly tensioned at all times and soon requires replacement. It has been suggested to park these by various means including a physical, preset latching device which mechanically locks the motor, preferably at a preselected end of its stroke. Where the differential pressure is removed from the motor coincidentally with engagement of the parking latch, the latching elements are not securely held and the wiper arm may flap under wind pressure. On the other hand, where the differential or suction pressure is maintained on the motor during parking, it is very difficult to withdraw the latching detent for re-starting.

Accordingly, it is an object of the present invention to provide a fluid pressure motor including reversing valve mechanism embodying a minimum number of parts of rugged and durable construction.

Another object is to provide reversing valve mechanism for a fluid pressure motor embodying a valve actuating spring which is most highly stressed only at the point of shifting and which, at other times and, particularly during parking, is stressed to a much lesser extent, or not at all.

Another object is to provide parking mechanism for a windshield wiper motor of the fluid pressure type embodying a physical stop or latch, in which fluid pressure is constantly applied to the motor during parking, but in which means is provided to momentarily relieve the fluid pressure to facilitate withdrawal of the parking detent.

Another object is to provide a windshield wiper parking device embodying a unitary manual control which functions coincidentally to apply releasing pressure to the parking latch and to relieve the motor pressure on the latching detent so as to facilitate withdrawal thereof.

Another object is to provide a unitary manual control for a windshield wiper motor which, by continued motion in one direction, functions to apply yielding withdrawing pressure to the motor locking detent, to shift the reversing valve to facilitate withdrawal of the detent, and to throttle or vary the effective suction pressure applied to the motor.

Still another object is to provide a fluid pressure motor of the oscillating vane type having a pair of independently pivoted vanes whereby the effective vane area and, consequently, the power of the motor is increased over that obtainable in a single vane motor without unduly increasing the bulk thereof.

These objects and other more detailed objects hereafter appearing are attained substantially by the mechanism illustrated in the accompanying drawings in which Fig. 1 is a partial view and section of the body portion of a vehicle, such as an automobile, showing a windshield wiper applied thereto.

Fig. 8 is a section through the valve casing similar to Fig. 5, but with most of the parts removed to expose the porting and wall structure therebeneath.

Fig. 9 is a detailed section taken on line 9—9 of Fig. 5 and showing a part of the manual control for shifting the reversing valve.

Figs. 9A, 9B, 9C and 9D are views similar to Fig. 9, but showing the parts, respectively, in positions for starting, and low, medium and high speed operation.

Fig. 10 is a detailed section taken on line 10—10 of Fig. 5 and showing a part of the manual control for releasing and setting the parking detent or latch.

Figs. 10A, 10B, 10C and 10D are views similar to Fig. 10, but showing the parts in the positions they assume when the control is moved, respectively, to starting and low, medium, and high speed operation.

Fig. 11 is a detailed section taken on line 11—11 of Fig. 5 and showing the manual control parts for throttling the fluid pressure applied to the motor.

Figs. 11A, 11B, 11C and 11D are views similar to Fig. 11, but showing the parts in the positions which they assume, respectively, when the parking control button is moved to the starting and low, medium, and high speed positions.

Fig. 12 is a view similar to Fig. 5, but showing the parts in the positions assumed when the manual control is moved to the starting position.

Fig. 13 is a view similar to Fig. 12 but showing the motor in operation with the ports positioned just before tripping of the valve.

Fig. 14 is a view similar to Figs. 12 and 13, but showing the valve shifted from the position shown in Fig. 13 and the motor reversed.

Fig. 15 is an under side view of the valve.

Fig. 16 is an outer side view of the valve.

Fig. 17 is an outer side view of the valve shifter.

Figure 1:
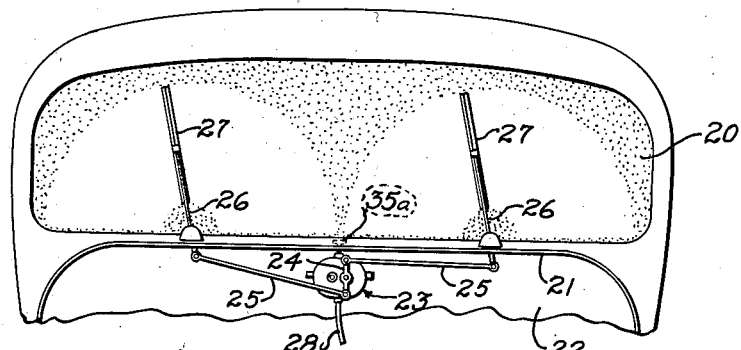
Figure 2:
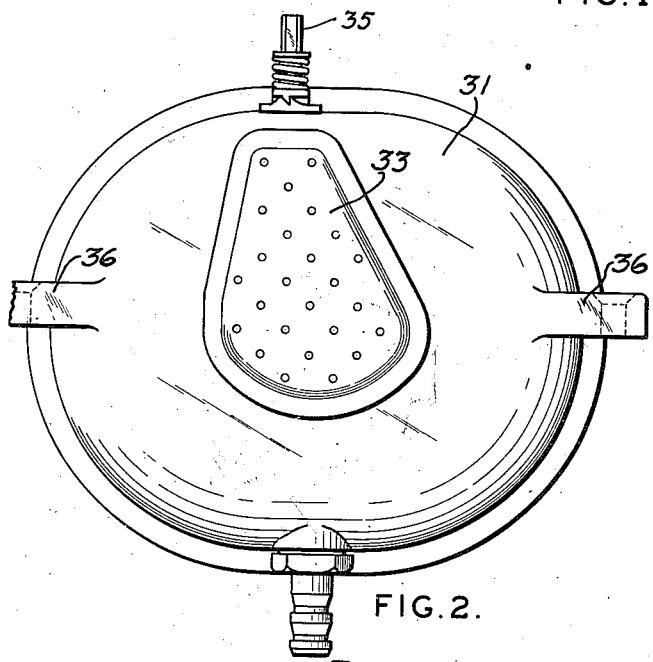
Fig. 2 is a rear view of the motor disassembled.
Figure 3:
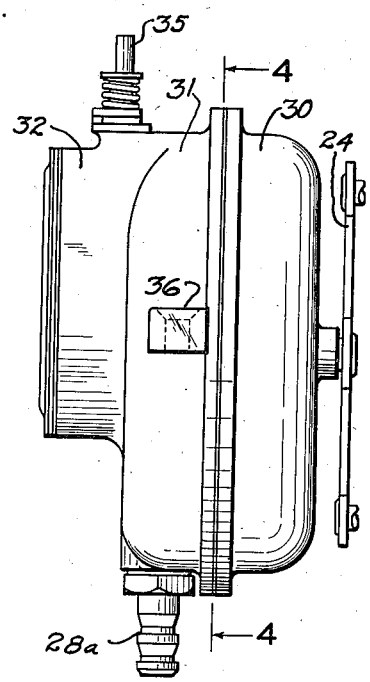
Fig. 3 is an edge view of the motor.

Fig. 1 shows a portion of an automobile body including windshield 20, a cowl 21, and a panel 22 enclosing the rear portion of the engine space under the hood. A windshield wiper motor 23, to be described in detail hereafter, is mounted on panel 22 beneath cowl 21 and connected by means of lever 24 and links 25 to pivoted arms 26 extending through the cowl and, at their upper ends, mounting windshield wiper blades 27 in the usual manner. The driving mechanism shown is such that the blades will be operated oppositely. The motor is connected by means of a nipple 28a and a suction line 28 to a suitable source of reduced pressure, such as the usual engine intake manifold (not shown), or to a suction pump.

The motor is housed within a casing including parts 30 and 31, the latter being enlarged rearwardly to form a valve chamber 32 having a perforated cover 33 whereby the inside of the valve chamber is exposed to substantially atmospheric pressure. A filtering screen 34 is interposed between the valve casing and cover. A manual control shaft 35 projects upwardly from the motor through cowl 21 and is provided with a suitable button as at 35a in Fig. 1. Suitable mounting brackets are shown at 36.

Figure 6:
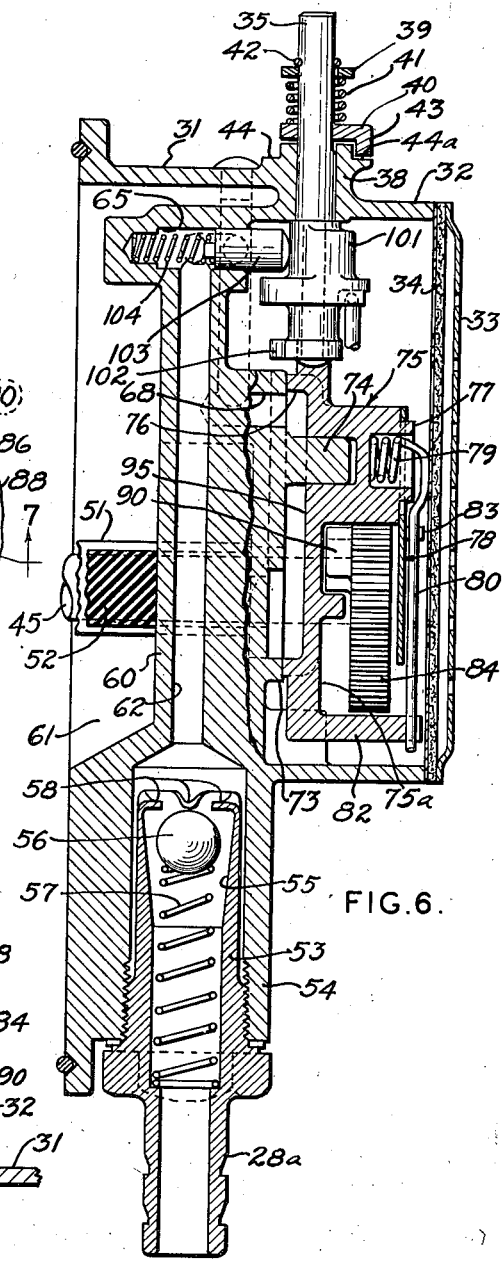
Figs. 6 and 7 are, respectively, vertical and horizontal sections taken approximately on the corresponding section lines of Fig. 5.

Control shaft 35 is rotatably received in an apertured boss 38 (Fig. 6) formed in the upper wall of valve casing 32 and receives a pair of washers 39 and 40 above the valve casing between which is compressed a coiled spring 41. Control shaft 35 and the apertures in washers 39 and 40 are non-circular so that rotation of the washers is prevented. Upper washer 39 is held in position by a horseshoe key 42. Lower washer 40 is provided with a tooth 43 which rides on the upper surface 44 of boss 38, this surface being provided with a notch 44a for receiving the tooth when the control and valve parts are in their parked positions. Formed rigidly on shaft 35 within the valve casing are three cams, 100, 101, and 102 to be further described hereafter.

Figure 4:
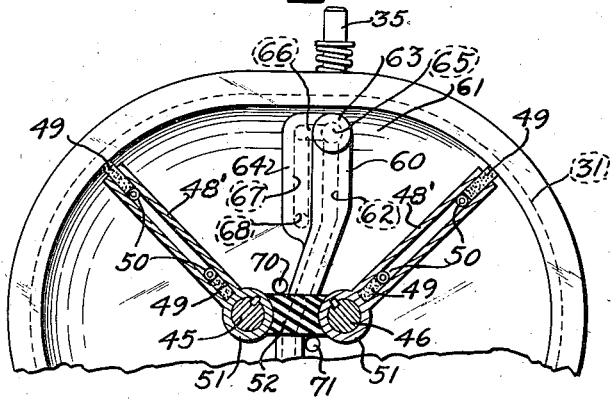
Fig. 4 is a partial section taken substantially on line 4—4 of Fig. 3.
Figure 7:
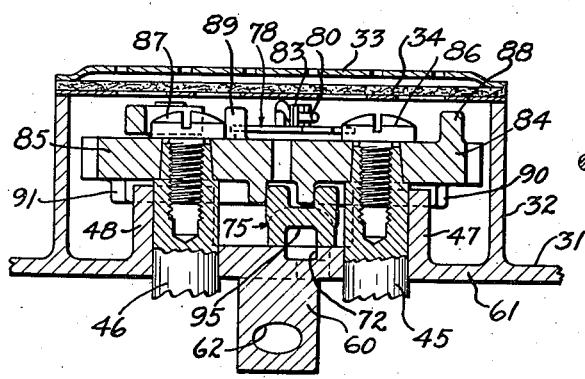

A pair of shafts 45 and 46 (Figs. 4, 7 and 8) extend across the motor housing, being supported therein in suitable bearing bosses 47 and 48 extending into valve casing 32. Rigidly attached to shafts 45 and 46 are a pair of vanes 48', each including spaced walls, as shown in Fig. 4, with the sealing elements 49 secured therebetween and constantly urged outwardly into engagement with the inner wall of the motor casing by springs 50. Sealing elements 49 may be made of leather or other suitable pressure sealing material. Mounted between shafts 45 and 46 and in fluid tight engagement with the hollowed shaft receiving portions 51 of the vanes is a bushing 52 preferably of leather or rubber or other material suitable for the purpose. Thus vanes 48' and bushing 52 form, in effect, a pair of expansible and contractible pressure chambers within the motor casing.

Nipple 28a for attachment to suction line 28 has a tubular extension 53 (Fig. 6) screwed into an apertured boss 54 depending from the motor casing. This extension is provided with a flow regulating valve device, including a tapered chamber 55, ball vlave 56, coiled spring 57, and valve retaining elements 58 arranged so that the suction connection is automatically restricted in direct proportion to the pressure differential available and thus provide for uniform motor speed, within limits. This valve arrangement is described and claimed in a co-pending application in the name of the present inventor, Serial No. 265,169, filed March 31, 1939, now issued as Patent No. 2,291,881.

A rib 60 extends along partition wall 61 between the valve and motor casings (Figs. 4, 6 and 7) and a suction passage 62 extends through this rib and communicates at its lower end with suction connection 28a. Rib 60 terminates in a hollowed boss 63 and a second rib 64 extends laterally and downwardly therefrom at the side of rib 60. Passage 62 connects with a valve chamber 65 in boss 63 and a cross passage 66, as best shown in Figs. 11–11D, inclusive. Cross passage 66, in turn, connects with a vertical passage 67 in rib 64 which, at its lower end, communicates with the interior of the valve casing through a port 68.

Slidable in valve chamber 63 is a plunger valve 103 urged outwardly against upper cam 101 on the control shaft by a coiled spring 104.

Ports 70 and 71 extend through partition wall 61 of the valve casing on opposite sides of sealing bushing 52 between the vane mounting, these ports functioning as differential pressure connections for the motor, as described hereafter. A curved slot 72 extends from upper port 70 along wall 61. A portion of wall 61 around ports 68, 70 and 71 is raised, as at 73, (Fig. 8) to form a valve facing.

A boss 74 projects from facing 73 into the valve casing and pivotally mounts an elongated hood valve, generally indicated at 75. The valve has a cylindrical depression 76 in its under face (Figs. 15 and 16) for receiving boss 74. On the outer side of valve 75 there is provided an apertured boss 77 which rotatably mounts the valve shifter, generally indicated at 78. A finger 106 projects longitudinally from the upper end of the valve for cooperating with lower cam 102 on control shaft 35, this cam having a raised point 102a for engaging the finger. A spring shifter wire has a coiled extremity 79 seated within boss 77 and an uncoiled portion 80 which extends along the valve shifter and, at its lower extremity is received between a pair of toes 81 formed on the outer end of a finger 82 projecting from the lower extremity of valve 75. Portion 80 of the spring wire is secured at an intermediate point between a pair of ears 83 bent outwardly from the metal of valve shifter 78.

Motor shafts 45 and 46 extend through partition wall 61 and to the tapered, squared extremities of these shafts within the valve casing there are secured a pair of gears 84 and 85 by means of screws 86 and 87. These gears extend and have meshing engagement between valve 75 and shifter 78, the valve being depressed, as at 75a, between boss 77 and finger 82 to accommodate the gears. On their outer faces, these gears are provided, respectively, with the pins 88 and 89, for cooperating with inclined edges 78a and 78b of the valve shifter and, on their opposite or inner faces, the gears are provided, respectively, with curved, valve-locking ribs 90 and 91. Left hand gear 85 is also provided on its outer face with a latching projection or shoulder 92 to be referred to hereafter.

The undersurface of valve 75 (Fig. 15) is provided with an elongated recess 95 for providing communication, selectively, between suction port 68 and one or the other of the motor ports 70 and 71, according to the position of the valve. Valve recess 95 in its intermediate portion extends around recess 75 for receiving boss 74. A pair of pins 107 project outwardly from the depressed intermediate portion of the valve for cooperating with gear ribs 90 and 91 in locking the valves during a portion of the motor stroke.

Pivotally mounted on a pin 96 (Fig. 5) projecting from partition wall 61 is a curved latching detent 97, the lower end of which is positioned to cooperate with latching shoulder 92 on gear 85 to positively stop the motor for parking of the windshield wipers. A spring wire 98 projects upwardly from detent 97 and has a bent portion 99 functioning as a cam follower for riding on the under surface of an intermediate cam 100 formed on control shaft 35 within the valve casing. A recess 100a is formed in the cam for receiving follower 99. The mechanism operates as follows:

Each of the groups of vertically aligned, detail Figures 9, 10, and 11, 9A, 10A and 11A, etc., represents corresponding positions of the three operating cams 100, 101, and 102, these being rotated simultaneously with control shaft 35.

Figure 5:
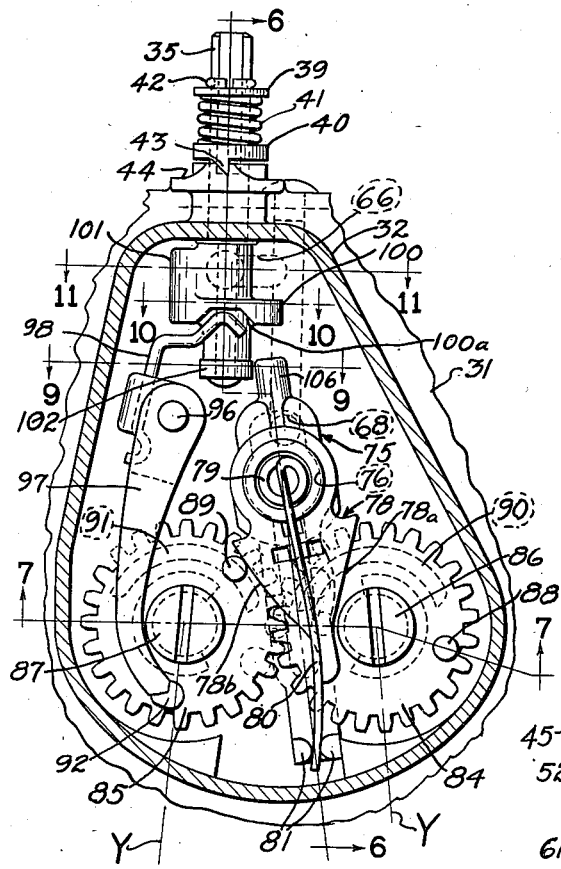
Fig. 5 is a view of the valve mechanism, the valve casing sectioned and the cover removed to expose the operating parts shown in parked position.

For stopping or parking the motor, control shaft 35 is rotated to the position shown in Fig. 5 and in detail in Figs. 9, 10, and 11 until tooth 43 enters notch 44a and recess 100a in intermediate cam 100 receives bent end 99 of spring 98 to permit detent 97 to fall of its own weight into position to drop into locking engagement with latching shoulder 92 when the motor vanes have reached the lower ends of their strokes, as represented by the broken lines Y—Y. Preferably, this latching occurs just after the valve has shifted to connect suction port 68 and motor port 70 which is above bushing 52. Thus, the force exerted by the motor, as indicated by the arrows on the gears 84 and 85, will tend to maintain the latching parts in secure engagement. In this position, valve projection 106 is clear of lower cam 102 and throttling valve 103 engages a low point on cam 101.

To start the motor, control shaft 35 is rotated clockwise to the position in Figs. 9A, 10A, 11A, and 12 so as to move recess 100a in the cam 100 away from detent spring 98 distorting the spring and applying yielding force to detent 97 in a direction to withdraw the lower extremity thereof from latching abutment or shoulder 92. At the same time, throttling valve 103 is depressed by cam 101 to substantially restrict suction passage 62 (Fig. 11A) and the motor valve is shifted by engagement of high point 102a on cam 102 with valve projection 106. Restricted suction is then applied to lower port 71, releasing the latching detent for withdrawal from shoulder 92 by spring 98.

Continued clockwise movement of control shaft 35 to the position in Figs. 9B, 10B, 11B and 13 withdraws the high point of cam 102 from valve projection 106 permitting return of valve 75 by spring 80 to its right hand position, again applying suction to the upper faces of the motor vanes. As lower port 71 is, at the same time, exposed to atmosphere inside casing 32, the motor will now start to operate slowly. In Fig. 11B, throttling valve 103 is forced still farther within passage 65 so as to further reduce the effective differential pressure applied to the motor.

Rotation of the control shaft to the positions in Figs. 9C, 10C, 11C, and 14 and then to the position in Figs. 9D, 10D, and 11D progressively opens throttling valve 103 to provide for medium and high speed operation of the motor.

One of the motor ports 70 and 71 will always be connected to suction port 68 by hood valve 75, while the other motor port will be connected to atmosphere which prevails inside the valve housing. In Fig. 13, the motor vanes are indicated as moving toward their upper positions and pins 107 on the valve are locked on the right side, respectively, of rib 90 on gear 84 and rib 91 on gear 85 so as to lock the valve against shifting. As the vanes approach the upper ends of their stroke, pin 88 on the right hand gear 84 engages the adjacent inclined edge of valve shifter 78 and rotates the shifter in a clockwise direction about its pivotal mounting, distorting spring wire 80, as shown. At the upper end of the vane stroke, curved gear ribs 91 and 90 pass beyond valve pins 107 so that the valve is freed therefrom and, accordingly, is snapped at its opposite position, as in Fig. 14, in which suction port 68 is connected to motor port 71 and the opposite motor port 70 is connected to atmosphere inside the valve housing. The movement of the motor and wiper blades is then reversed, valve pins being restrained on the left sides of gear ribs 90 and 91 (Fig. 14) and the valve shifter being rotated counterclockwise by pin 89 on left hand gear 85 therewith as the vanes approach the lower ends of their strokes.

The motor will continue to operate until the control shaft and cams are returned to the positions of Figs. 5, 9, 10 and 11, whereupon detent 97 will be dropped to lock with shoulder 92 at the selected end of the motor stroke. To start and stop the motor the control button and shaft may be rapidly rotated from one extreme position to the other, no delay being necessary to insure proper operation of the various controls.

Various modifications may be made as will occur to those skilled in the art and the exclusive use of all such modifications as come within the scope of the appended claims is contemplated.

I claim:

1. In a fluid motor, a chamber and movable wall structure, ports for exposing said chamber, selectively, to differential pressures, a reversing valve for said ports having a locking projection, a valve shifter movable with said wall structure, a spring between said valve and said shifter, and drive mechanism including a pair of adjacent rotating members each having a valve locking abutment, said abutments being adapted to selectively engage and lock said valve during a portion of the stroke of said wall structure and shifter so as to stress said spring and to release said valve for shifting by said spring substantially at the ends of said stroke.

2. In a fluid motor, differential pressure ports and a reversing valve therefor, a valve shifter spring means between said valve and said shifter, drive mechanism including meshing gears each having a curved rib, said valve shifter operated by said mechanism, one of said ribs being constructed and arranged to engage and lock said valve in one of its operative positions during the major portion of the motor stroke in one direction and to release said valve for shifting by said spring substantially at the succeeding end of said stroke, and the other rib being disposed to hold said valve in another operative position during operation of the motor in the opposite direction.

3. In a fluid motor, a pair of pressure chambers and movable wall structures therefor, differential pressure ports for said chambers, a reversing valve cooperable with said ports, a valve shifter operable with said wall structure, spring means between said valve and said shifter, meshing gears operable with said wall structure, and a locking abutment on each of said gears, one of said abutments being positioned to engage and lock said valve during a portion of the motor stroke in one direction to cause stressing of said spring by said shifter and to release said valve for shifting by said spring substantially at the end of said stroke, and the other abutment being positioned to lock said valve in its other position during operation of the motor in the opposite direction and to release said valve at the succeeding end of the motor stroke.

4. In a fluid motor, a pressure chamber and movable wall structure therefor, drive mechanism including a pair of meshing gears, differential pressure ports for said chamber, a reversing valve located on one side of the general plane of said gears, a valve shifter on the other side of said plane, a spring between said valve and said shifter, a projection on each of said gears and cooperable with said shifter for moving the same back and forth coincident with the stroke of said wall structure, and a curved rib on each of said gears, said ribs being alternately engageable with said valve each to lock the same during a portion of the motor stroke in one direction so as to stress said spring, said ribs being shaped and positioned to release said valve for shifting by said spring substantially at the ends of said strokes.

5. In a windshield wiper, a fluid motor including a pressure reversing valve, transmission mechanism including a part having a locking shoulder, a detent movably mounted adjacent said part, and a parking control including a manually operable member, and a yielding device constituting an operating connection between said manual member and said detent, said control being constructed and arranged when moved to the parking position to cause said detent to move into the path of said shoulder for stopping the motor at a pre-selected point in its stroke, said control, when moved to the starting position functioning to render said yielding means operative to withdraw said locking detent from said shoulder and to reverse said valve so as to relieve the pressure upon said detent and facilitate such withdrawal.

6. In a windshield wiper, a fluid motor including pressure actuated wall structure, and a parking control including a latching shoulder movable with said wall structure, a detent having an operative position for engaging said shoulder to park the motor at a predetermined point in its stroke, a device for relieving the pressure between said shoulder and said detent, and means for moving said detent away from said shoulder to start the motor.

7. Windshield wiper mechanism as specified in claim 6 in which said pressure relieving device and said detent moving means are operable co- incidentally responsive to actuation of a unitary motor control element.

8. In a windshield wiper, a fluid motor including pressure actuated wall structure, and a parking control comprising a manual control element, a shoulder movable with said wall structure, a detent movable to an operative position when said control element is moved to its parking position to engage said shoulder for stopping the motor at a preselected point in its stroke, yielding means rendered operative when said control element is moved to its running position for urging said detent clear of said shoulder, and means to relieve the pressure exerted on said detent by said motor wall structure to release said detent for removal from said shoulder by said yielding means to start the motor.

9. Windshield wiper mechanism as specified in claim 8 in which said motor further includes a pressure reversing valve, said control element having a part for actuating said valve to relieve the pressure on said detent.

10. In a windshield wiper, power drive mechanism including a transmission, reversing elements therefor, parking mechanism including a part for engaging said drive to positively stop the windshield wiper without avoiding the force of said drive whereby said parts are maintained in secure engagement, and means to momentarily relieve said force and coincidentally release said engaging parts for starting the windshield wiper.

11. In a windshield wiper, a fluid motor including movable wall structure, a latching shoulder movable with said wall structure, a detent normally urged toward an operative position to engage said shoulder and park said motor at a pre-determined point in its stroke, a manual control element for the motor, a yielding operative connection between said detent and said control element whereby said control element when moved to its running position tends to withdraw said detent from said shoulder, said detent being moved to its operative position when said control element is moved to its parking position without affecting said motor whereby the force of said motor maintains said shoulder and said latch firmly engaged, and means actuated by said control element when moved toward its running position to relieve the pressure of said motor for releasing said detent from said shoulder.

12. In a fluid motor, movable wall structure, a pressure reversing valve, a manual control element, a latching shoulder positively movable with said wall structure, a detent movable to a position when said control element is moved to one position to engage said shoulder and stop the motor at a predetermined point in its stroke without affecting the normal operation of said valve, yielding means rendered operative when said control element is moved to a second position to apply a force tending to withdraw said detent from said shoulder, a pressure throttling valve, and an operative connection between said control element and said throttling valve for operating the latter upon movement of the former to and beyond said second position.

13. In a windshield wiper, a fluid motor, a latching device for mechanically stopping the motor without avoiding the force exerted thereby, a pressure throttling valve, and a manual control element having operative connection with said throttling valve and said latching device for momentarily relieving the pressure exerted by said motor when said control element is moved to its running starting position to facilitate release of said latching device.

14. In a windshield wiper, a fluid pressure motor having a reversing valve, a positive latching device for stopping the motor, a pressure throttling valve, and a manual control element having operative connections with said valves and said latching device whereby movement of said control element to starting position initiates a force for effecting release of said latching device and actuates both of said valves to reverse and reduce the pressure exerted by said motor to facilitate release of said device.

15. Windshield wiper mechanism as specified in claim 14 in which said control element functions through its operative connection with said throttling valve and upon movement thereof beyond its starting position to vary the differential fluid pressure applied to said motor and thereby control the motor speed.

IRVEN E. COFFEY.